(12) United States Patent
Choi et al.

(10) Patent No.: US 7,849,146 B2
(45) Date of Patent: Dec. 7, 2010

(54) IDENTIFYING IP ADDRESSES FOR SPAMMERS

(75) Inventors: Jaesik Choi, Savoy, IL (US); Jay Pujara, Palo Alto, CA (US); Vishwanth Tumkur Ramarao, Sunnyvale, CA (US); Ke Wei, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 343 days.

(21) Appl. No.: 12/035,371

(22) Filed: Feb. 21, 2008

(65) Prior Publication Data
US 2009/0216841 A1 Aug. 27, 2009

(51) Int. Cl.
*G06F 15/16* (2006.01)
(52) U.S. Cl. ....................................................... 709/206
(58) Field of Classification Search .................. 709/204, 709/206
See application file for complete search history.

(56) References Cited

U.S. PATENT DOCUMENTS

| | | | |
|---|---|---|---|
| 6,052,709 A | 4/2000 | Paul | |
| 6,393,465 B2 | 5/2002 | Leeds | |
| 6,415,318 B1 | 7/2002 | Aggarwal et al. | |
| 6,421,709 B1 | 7/2002 | McCormick et al. | |
| 6,453,327 B1 | 9/2002 | Nielsen | |
| 6,643,686 B1 | 11/2003 | Hall | |
| 6,650,890 B1 | 11/2003 | Irlam et al. | |
| 6,772,196 B1 | 8/2004 | Kirsch et al. | |
| 6,957,259 B1 | 10/2005 | Malik | |
| 7,120,455 B1 | 10/2006 | Chen et al. | |
| 7,257,842 B2 | 8/2007 | Barton et al. | |
| 2003/0140103 A1 | 7/2003 | Szeto et al. | |
| 2004/0177110 A1* | 9/2004 | Rounthwaite et al. | 709/202 |
| 2004/0255122 A1 | 12/2004 | Ingerman et al. | |
| 2004/0260776 A1* | 12/2004 | Starbuck et al. | 709/206 |
| 2007/0112954 A1 | 5/2007 | Ramani et al. | |
| 2007/0192863 A1 | 8/2007 | Kapoor et al. | |
| 2008/0320119 A1* | 12/2008 | Achan et al. | 709/222 |

OTHER PUBLICATIONS

"Bloom Filter," Wikipedia, the free encyclopedia, 7 pgs., http://en.wikipedia.org/wiki/Bloom_filter (accessed May 22, 2007).

(Continued)

*Primary Examiner*—Wing F Chan
*Assistant Examiner*—Andrew Woo
(74) *Attorney, Agent, or Firm*—Frommer Lawrence & Haug LLP; Jamie L. Wiegand

(57) ABSTRACT

Detecting and blocking spam messages using statistical analysis on distributions of message sizes for a given IP address. Mail volumes are examined to model a distribution of volumes to cluster IP addresses. The messages sizes may distributed across ranges of message sizes, which is then used to determine an entropy of message sizes for the given IP address. The entropy of the given IP address may be compared to entropies of known good IP addresses, and if a difference between the entropies is statistically significant, then the given IP address may be determined to be an IP spammer. User feedback may also be employed to further characterize an IP address. For example, a number of messages from the IP address may be sent to intended recipients. User feedback may then be monitored to determine whether to the IP address should be reclassified.

17 Claims, 7 Drawing Sheets

OTHER PUBLICATIONS

Dhamija, Rachna, "Security Skins: Embedded, Unspoofable Security Indicators," Jun. 19, 2006, 57 pgs. Harvard University.
Dhamija, Rachna et al., "Why Phishing Works," Apr. 2006, 10 pgs.
Dhamija, Rachna et al., "The Battle Against Phishing: Dynamic Security Skins," Jul. 2005, 12 pgs.
Registration Demonstration; Sign-in From New Device; Sign-in Demonstration, 20 pgs., http://passmarksecurity.breezecentral.com/p70238971 (accessed Jun. 13, 2006).
Kristol, D. et al., "HTTP State Management Mechanism," Feb. 1997, 21 pgs., Network Working Group.
Taylor, Bradley, "Sender Reputation in a Large Webmail Service," 6 pgs., Google Inc.
Taylor, Bradley, "Sender Reputation in a Large Webmail Service CEAS 2006," Jul. 27, 2006, 19 pgs., Google Inc.
"Antivirus software," Wikipedia, the free encyclopedia, 4 pages, http://en.wikipedia.org/wiki/Virus_scanner, (accessed Nov. 27, 2007).
Iwanchuk, Russ, FindArticles—"IM Anti-Virus and IM Message Inspector," http://findarticles.com/p/articles/mi_zdpcm/is_200106/ai_ziff2220/print, p. 1 of 1, Oct. 29, 2007.
"Malware," Wikipedia, the free encyclopedia, 8 pages http://en.wikipedia.org/wiki/Malware, (accessed Nov. 27, 2007).
"Instant messaging," Wikipedia, the free encyclopedia, 7 pages, http://en.wikipedia.org/wiki/Instant_messaging, (accessed Nov. 27, 2007).
International Search Report and Written Opinion, mailed Jan. 31, 2006 for Patent Application PCT/US04/35402 filed on Oct. 26, 2004.
Slashdot, FAQ—Comments and Moderation#cm600, http://slashdot.org/fq.com-mod.shtml, pp. 1-18, Nov. 15, 2007.
Flickr Community Guidelines, http:/flickr.com/guidelines.gne, pp. 1-3, Nov. 15, 2007.
Craigslist online community, craigslist help > flags and community moderation, http://www.craigslist.org/about/help/flags_and_community_moderation, updated Nov. 7, 2007.

* cited by examiner

IDENTIFYING IP ADDRESSES FOR SPAMMERS

TECHNICAL FIELD

The present invention relates generally to computing security, and more particularly but not exclusively to detecting and blocking spam messages based, in part, on statistical analysis of message size distributions for messages from an IP address.

BACKGROUND

The problem of spam in established communication technologies, such as electronic mail, is well-recognized. Spam may include unsolicited messages sent by a computer over a network to a large number of recipients. Spam includes unsolicited commercial messages, but spam has come to be understood more broadly to additionally include unsolicited messages sent to a large number of recipients, and/or to a targeted user or targeted domain, for malicious, disruptive, or abusive purposes, regardless of commercial content. For example, a spammer might send messages in bulk to a particular domain to exhaust its resources.

However, a sender of a large number of messages might not be considered a spammer. For example, an educational, financial institution, health institution, or the like, might send a large number of messages to its alumni, members, or the like. Similarly, known and/or generally acceptable merchants might send large number of messages that the recipients may actually want to receive. Such bulk message distributors may be well known by its recipients, who may actually seek to receive the messages. Thus, a sender of a large number of messages cannot be classified based solely upon the quantity of messages it sends. Because recipients of the bulk messages may know and accept messages from these senders, filters need to be tuned to allow the messages to be delivered. Difficulty often arises in algorithmically classifying a sender as a spammer, a reputable source, or somewhere in between. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Descriptions, which is to be read in association with the accompanying drawings, wherein.

DETAILED DESCRIPTION

Figure 1:
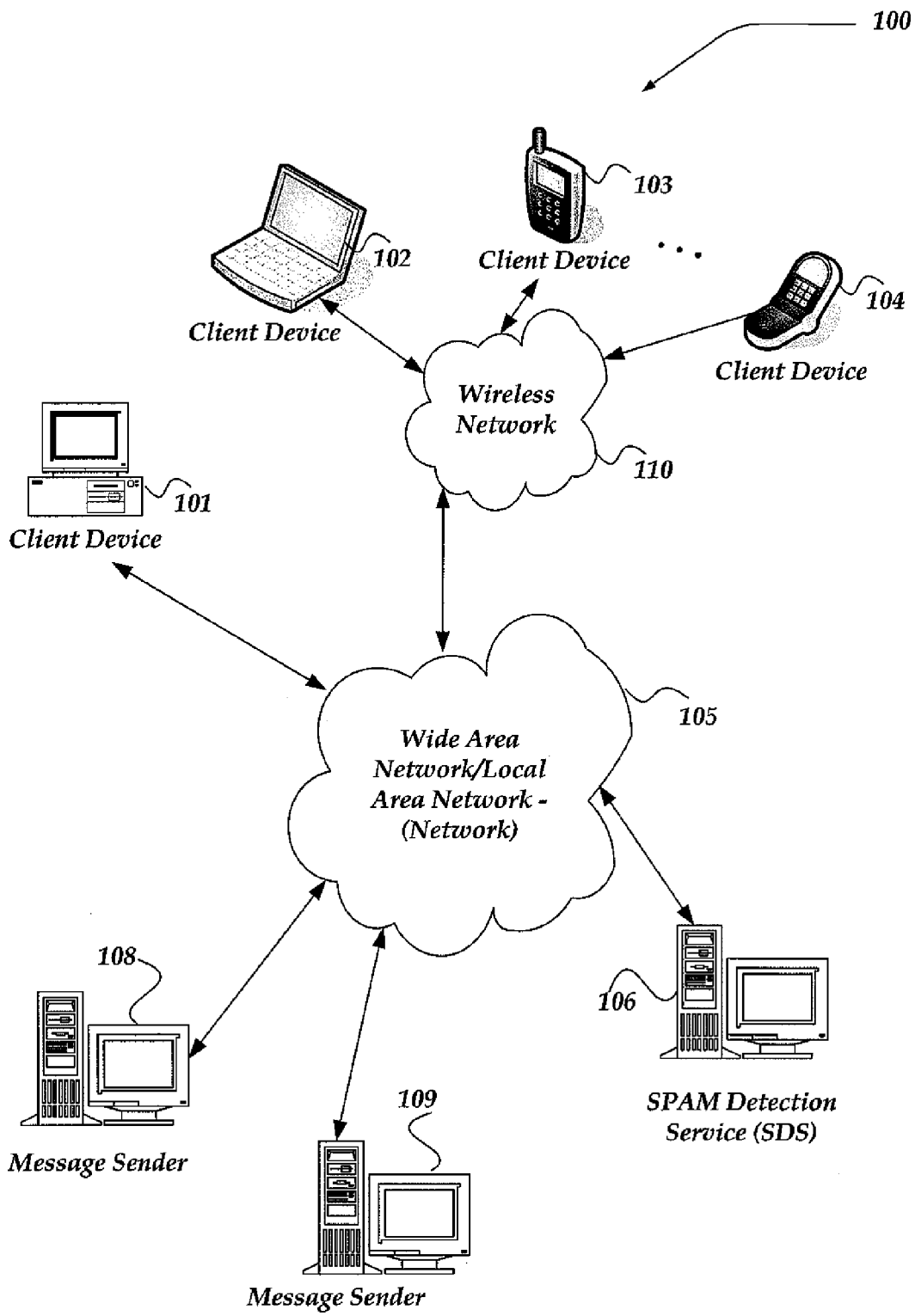
FIG. 1 shows a functional block diagram illustrating an environment for use in detecting image spam.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase"in one embodiment" as used herein does not necessarily refer to the same embodiment, though it may. As used herein, the term"or" is an inclusive"or" operator, and is equivalent to the term"and/or," unless the context clearly dictates otherwise. The term"based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly, the present invention is directed towards detecting and selectively blocking spam messages by performing statistical analysis on distributions of message sizes for messages from a given IP address. In one embodiment, a network device is configured to detect spamming IP addresses substantially in real-time. Initially, mail volumes from IP addresses are examined to model a distribution of volumes of messages to cluster IP addresses about IP groups. Message sizes sent from each IP group are examined to model an approximate normal distribution of message sizes from an IP group. The messages sizes may be split based on ranges of message sizes, such that messages are approximately evenly distributed across the ranges. Each range of sizes is used to determine an entropy of message sizes. Given an IP address, a determination is made which volume group of IPs the given IP address may be associated with based on a plurality of messages (volume) sent from the given IP address. Moreover, the plurality of messages from the given IP address may be distributed across the ranges based on sizes of each message. The entropy for the given IP address is then determined based on the distribution of messages across the various size ranges. The entropy of the given IP address may be compared to entropies of at least one known good IP address (that is, IP addresses known to generally not send spam messages) for a given IP group. Based on a difference between the entropies, the given IP address may be determined to be an IP spammer, a possible spammer (e.g., a bulk mailer), or even a non-spammer.

In one embodiment, IP address entropies may be employed in conjunction with other spammer detection mechanisms, including, but not limited to content based spam detection. Employing the entropy-based analysis may improve detection latency of content based spam detection mechanisms, and yield an overall improved spammer detection rate. In one embodiment, user feedback may also be employed to further characterize an IP address and minimize improper classifications of an IP address (e.g. false positives). Based, in part, on trusted user feedback, a signature based exemption may be applied such that improperly identified IP addresses may be properly allowed when a next message is received from that IP address.

If the messages from a suspicious IP address (e.g., bulk mailer) are detected as ham (e.g. not spam), then in another embodiment, a number of messages from the IP address may be selected, such as being randomly selected, to exploit the characteristics of the IP address. That is, in one embodiment, selected messages may be blocked from being sent to an intended recipient, while other messages from the IP address may be allowed to be sent. User feedback may then be monitored to determine whether the IP address should be re-classified as a good IP address (e.g., not a spammer), or as a spammer.

Illustrative Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, client devices 101-104, Spam Detection Service (SDS) 106, and message senders 108-109

Generally, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. One embodiment of a mobile device usable as one of client devices 102-104 is described in more detail below in conjunction with FIG. 2.

Client device 101 may include virtually any computing device that typically connects using a wired communications medium such as personal computers, multiprocessor systems, microprocessor-based or programmable consumer electronics, network PCs, or the like. In one embodiment, client devices 101-104 may be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send a message.

The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), Internet Protocol (IP) address, network address, or other device identifier. The information may also indicate a content format that the client device is enabled to employ. Such information may be provided in a message, or the like, sent to another computing device.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-104 also may include at least one other client application that is configured to receive from and to send content to another computing device. The client application may include a capability to provide and receive textual content, multimedia information, or the like. In one embodiment, at least one of client devices 101-104 may be employed to send and/or receive spam messages.

Client devices 101-104 may further be configured to include a client application that enables the user to log into a user account that may be managed by another computing device, such as content server 108, cluster service 106, or the like. Such user account, for example, may be configured to enable the user to receive emails, send/receive IM messages, SMS messages, access selected web pages, participate in a social networking activity, provide messages that may be viewed as spam, ham messages, or the like. However, managing of messages may also be performed without logging into the user account.

In one embodiment, client devices 101-104 may employ one or more folders, directories, databases, or the like, that may be configured to receive and/or otherwise manage messages. For example, in one embodiment, client devices 101-104 may employ an inbox, a spam box, an outbox, and/or the like. Such "boxes" may be managed through one or more client applications, including, for example, a client mail application, web browser mail interface application, or the like. In one embodiment, the boxes may reside on the client device. However, in another embodiment, part or all of the boxes may reside on a remote network device, such as SDS 106, message sender 108-109, or the like.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple cluster service 106 and its components with other computing devices, including, content server 108, client device 101, and through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

One embodiment of SDS 106 is described in more detail below in conjunction with FIG. 3. Briefly, however, SDS 106 may include virtually any computing device capable of connecting to network 105 to enable managing of messages by at least detecting spam messages being sent by an IP address, and selectively inhibiting detected spam messages, and/or messages suspected of being spam from being sent to an intended recipient.

In one embodiment, SDS 106 may include an application that determines whether a given IP address is a spammer, suspected as a spammer, or not, based on a statistical analysis of an entropy of message sizes for messages from the IP address. In one embodiment, SDS 106 may then selectively inhibit sending of subsequent messages from the IP address determined to be a spammer. In one embodiment, SDS 106 may also employ user feedback to classify and/or re-classify an IP address. SDS 106 may employ processes such as described below in conjunction with FIGS. 4-7 to perform at least some of its actions.

SDS 106 may also include a message transfer manager to manage messages employing any of a variety of email protocols, including, but not limited, to Simple Mail Transfer Protocol (SMTP), Post Office Protocol (POP), Internet Message Access Protocol (IMAP), NNTP, or the like. However, SDS 106 is not constrained to detecting and/or otherwise managing merely email messages based on message size distributions, and other messaging protocols, and message servers may also be employed.

Devices that may operate as SDS 106 include personal computers, desktop computers, multiprocessor systems, microprocessor-based or programmable consumer electronics, network PCs, servers, or the like.

Message senders 108-109 include virtually any network computing device that is configured to provide various resources, including messages, content, and/or services over network 105. Message senders 108-109 may provide content and/or services for any of a variety of activities, including, but not limited to merchant businesses, financial businesses, insurance businesses, educational, governmental, medical, communication products, and/or services, or virtually any other site of interest. Many of such activities may communicate over the internet using a variety of mechanisms, including, but not limited to email, IM, SMS, or the like.

Message senders 108-109 may represent, in one embodiment, a messaging server, that is configured to provide messages to one or more of client devices 101-104. In one embodiment, the messages may include bulk messages, where at least some of the messages may be classified as spam messages. However, in one embodiment, one of message senders 108-109 may also be configured such that at least some of the messages may be identified as ham or not spam messages.

In one embodiment, message senders 108-109 may uniquely identify themselves through any of a variety of mechanisms, including an Internet Protocol (IP) address, network address, or other device identifier. It should be noted, however, that spam may be sent through message senders 108-109 from another network device, such that an IP address or other identifier of the actual message sender might not be the IP address, or other identifier, of message sender 108 or 109. Moreover, message senders 108-109 may represent a mechanism, such as a proxy service, gateway, or the like, that receives and manages messages for other network devices, that may reside within a sub-network of IP addresses.

Spam messages may also be sent from one or more of client devices 101-104. Thus, it should be understood that any network device, including, but not limited to client devices 101-104 and/or message senders 108-109, or the like, may be employed to send spam messages.

Devices that may operate as message senders 108-109 include, but are not limited to personal computers, desktop computers, multiprocessor systems, microprocessor-based or programmable consumer electronics, network PCs, servers, network appliances, and the like.

Illustrative Client Environment

Figure 2:
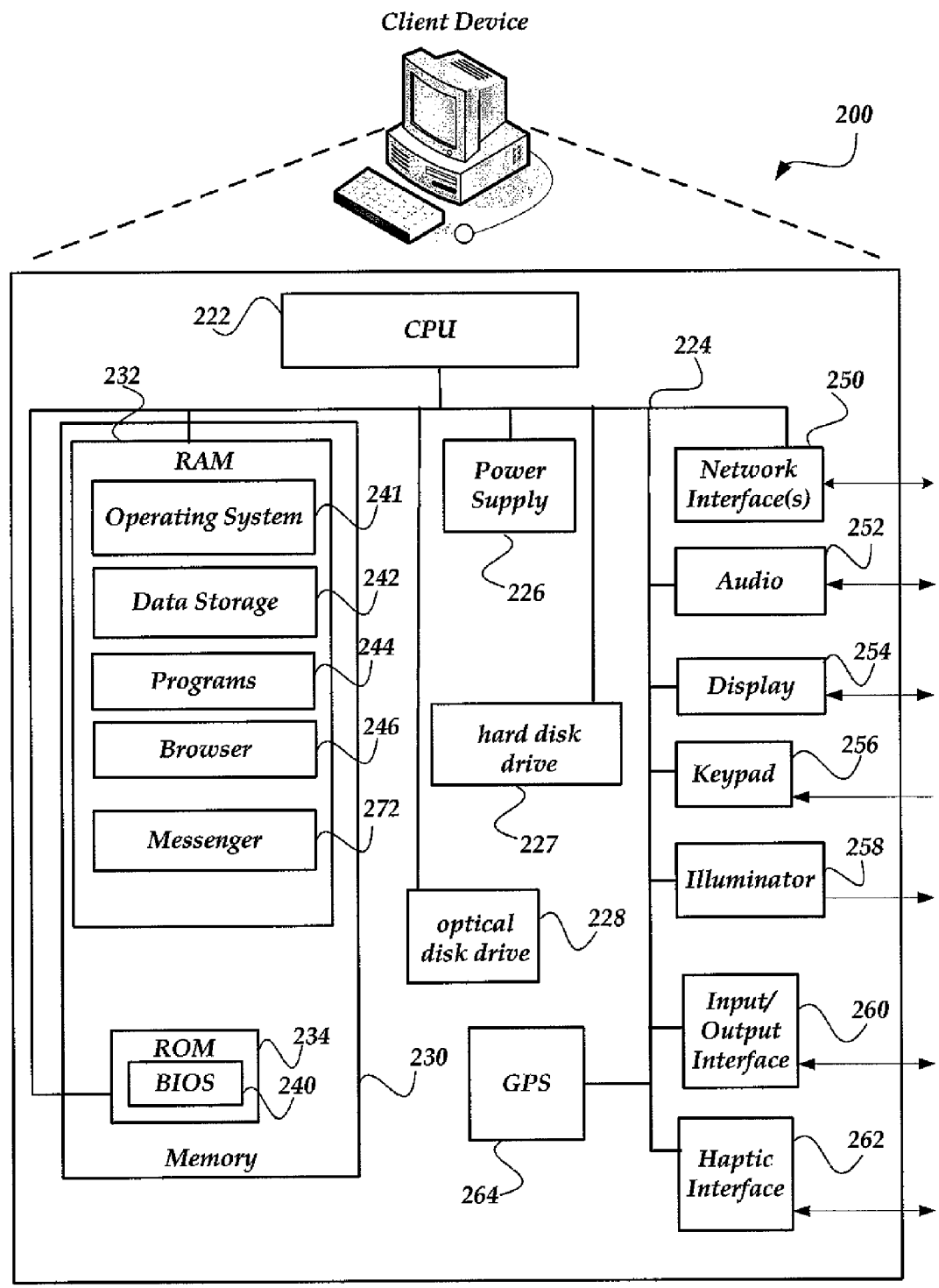
FIG. 2 shows one embodiment of a client device that may be employed within the environment illustrated in FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UiWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted OPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of client device 200. The information may then be provided to another device based on any of a variety of events, including being sent as part of a header during a communication, sent upon request, or the like. Moreover, data storage 244 may also be employed to store personal information including but not limited to address lists, contact lists, personal preferences, or the like. In one embodiment, data storage 244 may be configured to store various message boxes, including but not limited to a message inbox, message spam box, message outbox, message trash box, or the like. Data storage 244 may also include statistical information about message senders. At least a portion of the information may also be stored on a disk drive or other storage medium within client device 200, such as hard disk drive 227, optical disk drive 228, or the like. In one embodiment, a portion of the information may also be located remote to client device 200.

Applications 242 may include computer executable instructions which, when executed by client device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VoIP applications, contact managers, task managers, transcoders, database programs, word processing programs, security applications, spreadsheet programs, games, search programs, and so forth. Applications 242 may also include browser 246, and messenger 272.

Browser 246 may be configured to receive and to send web pages, forms, web-based messages, and the like. Browser 246 may, for example, receive and display (and/or play) graphics, text, multimedia, audio data, and the like, employing virtually any web based language, including, but not limited to Standard Generalized Markup Language (SMGL), such as Hyper-Text Markup Language (HTML), a wireless application protocol (WAP), a Handheld Device Markup Language (IDML), such as Wireless Markup Language (WML), WMLScript, JavaScript, and the like.

Messenger 272 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 272 may be configured as an ™ application, such as AOL Instant Messenger, Yahoo! Messenger, NET Messenger Server, ICQ, or the like. In one embodiment messenger 272 may be configured to include a mail user agent (MUA) such as Elm, Pine, MH, Outlook, Eudora, Mac Mail, Mozilla Thunderbird, or the like. In another embodiment, messenger 272 may be a client application that is configured to integrate and employ a variety of messaging protocols. In one embodiment, messenger 272 may employ various message boxes to manage and/or store messages.

It should be noted that messenger 272 may also be configured to manage and otherwise perform statistical analysis on message sizes of messages received from an IP address, or other source identifier, and to detect whether the message sender is a spammer, suspected as a spammer, or a ham sender. Thus, in one embodiment, each client device 200 may be configured to manage statistical detection and management of spam messages rather than having such actions performed by a remote device.

Illustrative Server Environment

Figure 3:
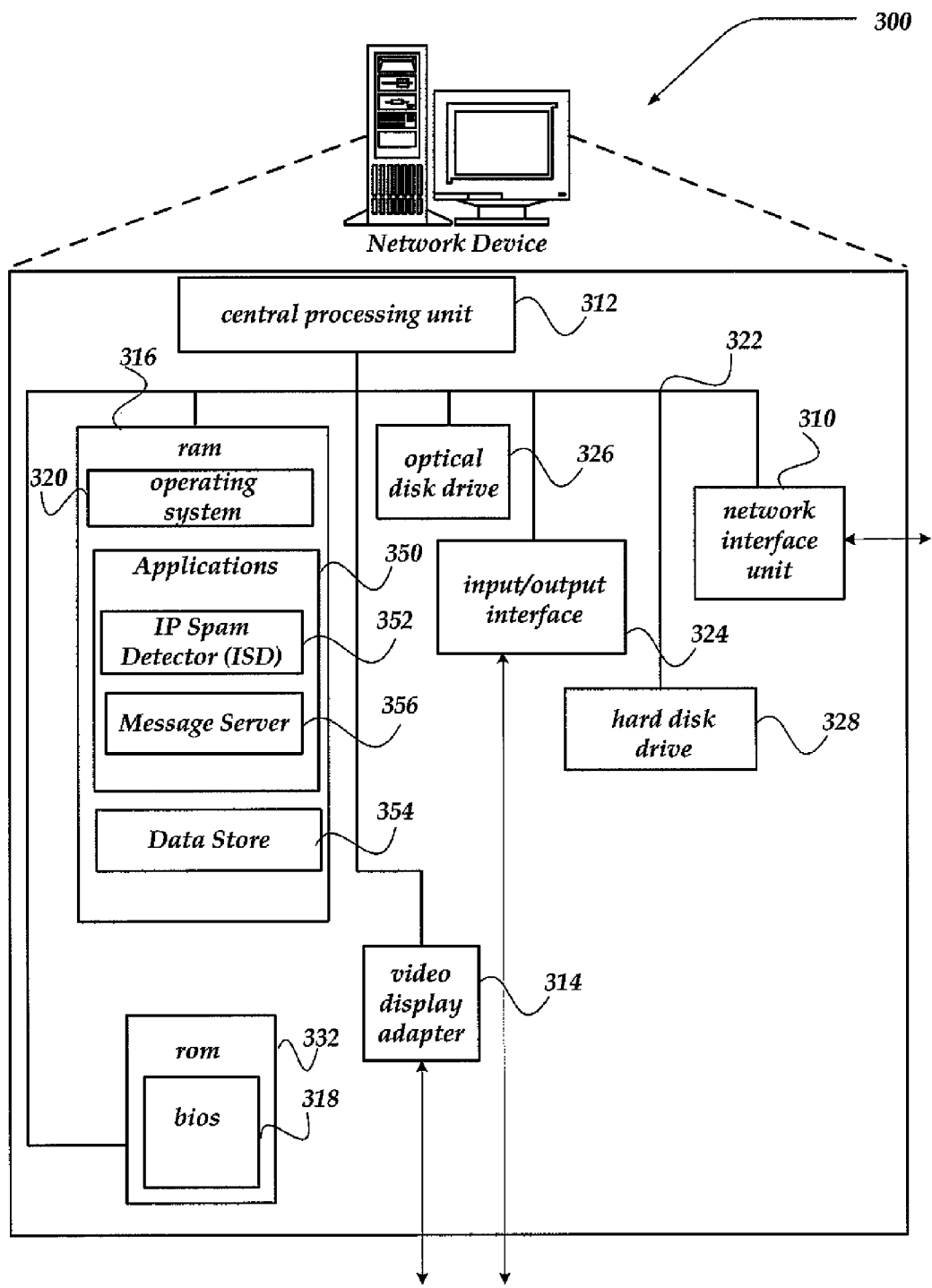
FIG. 3 shows one embodiment of a network device that may be employed to provide image spam detection.

FIG. 3 shows one embodiment of a network device, according to one embodiment of the invention. Network device 300 may include many more or less components than those shown. The components shown, however, are sufficient to disclose an illustrative embodiment for practicing the invention. Network device 300 may, for example, represent SDS 106 of FIG. 1.

Network device 300 includes processing unit 312, video display adapter 314, and a mass memory, all in communication with each other via bus 322. The memory generally includes RAM 316, and ROM 332. Network device 300 also includes one or more mass storage devices, such as hard disk drive 328, tape drive, optical disk drive, and/or floppy disk drive. The memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, network interface card (NIC), or the like.

Network device 300 may also include an SMTP handler application for transmitting and receiving email. Network device 300 may also include an HTTP handler application for receiving and handing HTTP requests, and an HTTPS handler application for handling secure connections. The HTTPS handler application may initiate communication with an external application in a secure fashion.

Network device 300 also may include input/output interface 324 for communicating with external devices, such as a mouse, keyboard, scanner, or other input devices not shown in FIG. 3. Likewise, network device 300 may further include additional mass storage facilities such as optical disk drive 326 and hard disk drive 328. Hard disk drive 328 is utilized by network device 300 to store, among other things, application programs, databases, or the like.

The memory and/or mass storage as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The memory also stores program code and data. One or more applications 350 are loaded into memory and run on operating system 320. Examples of application programs include schedulers, calendars, transcoders, database programs, word processing programs, spreadsheet programs, security programs, web servers, and so forth. Mass storage may Her include applications such message server 356, Image Spam Detector (ISD) 352, and data store 354.

Data store 354 is configured and arranged to store and otherwise manage messages, statistical data, white lists, grey lists, dark-grey lists, or the like. Data store 354, however, is not limited to managing storage of these example items, and other items, data, information, or the like, may also be stored within data store 354, without departing from the scope of the invention. For example, data store 354 may also include user account information, policies, procedures or the like, useable for inhibiting delivery of message spam. Data store 354 may be implemented using a variety of technologies, including, but not limited to, folders, spreadsheets, data bases, scripts, applications, or the like.

Message server 354 may include virtually any computing component or components configured and arranged to forward messages from message user agents, and/or other message servers, or to deliver messages to a local message store, such as data store 354, or the like. Thus, message server 354 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like.

However, message server 354 is not constrained to email messages, and other messaging protocols may also be managed by one or more components of message server 354. Thus, message server 354 may also be configured to manage SMS messages, IM, MMS, IRC, mIRC, or any of a variety of other message types. In one embodiment, message server 354 may interact with IP Spam Detector (ISD) 356 to manage spam messages.

ISD 352 is configured and arranged to detect and block malicious IP addresses from sending spam messages to an intended recipient. ISD 352 may perform such actions, in part, by performing statistical analysis of message size distributions to determine an entropy of message sizes for a given IP address. Based on the determined entropy, the given IP address may be identified as a message spammer, a non-message spammer (ham sender), or suspected as a spam message sender.

In one embodiment, ISD 352 may further identify, and/or re-classify an IP address based on user feedback, white lists, dark-grey lists, and/or grey lists. ISD 352 may place a sub-network, sub-domain, or the like, into at least one of these lists based on user feedback, and/or statistical analysis of message sizes for messages sent from a one or more IP addresses within the sub-network, or the like. For example, where a sub-network of addresses is determined to be within a given list, related IP addresses may also be classified with the same list. Thus, for example, where IP address from 128.121.64.X are determined to be spammers, and identified within the dark-grey list then messages from 128.121.64.140 would also be identified as from a spammer IP address. It should be noted, however, that while IP addresses are employed to identify a source of a message, the invention is not constrained to using merely IP addresses, and virtually any source identifier may be used, without departing from the scope of the invention. In any event, ISD 352 may employ processes such as those described below in conjunction with FIGS. 4-7 to perform at least some of its actions.

Generalized Operation

Figure 4:
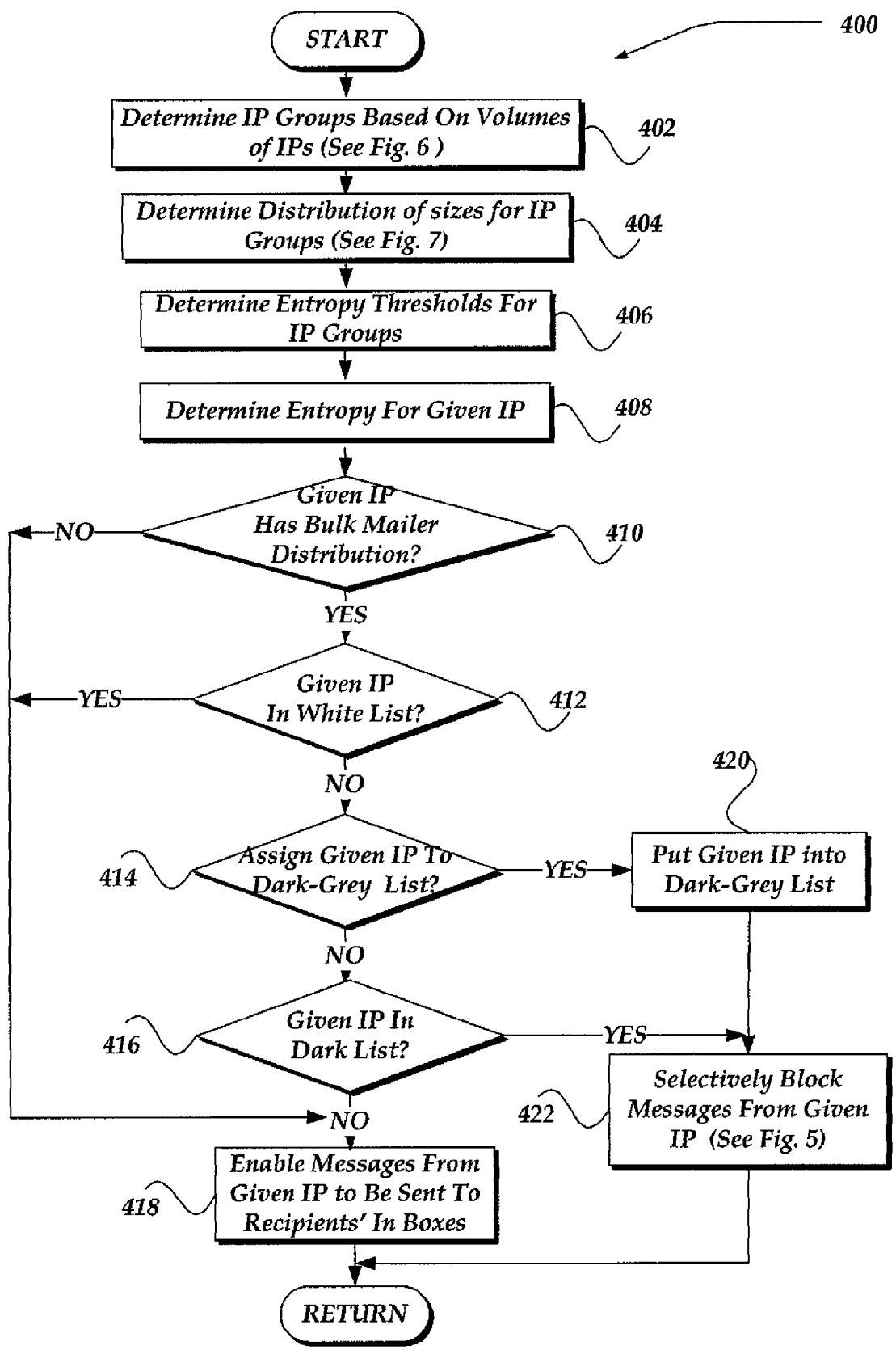
FIG. 4 illustrates a flow diagram generally showing one embodiment of an overview of process of detecting a spammer using IP addresses and managing message based on such detection.

The operation of certain aspects of the present invention will now be described with respect to FIGS. 4-7. FIG. 4 illustrates a flow diagram generally showing one embodiment of an overview of process of detecting a spammer using IP addresses and managing message based on such detection. Process 400 of FIG. 4 may be implemented within SDS 106 of FIG. 1. However, in another embodiment, at least one of client devices 101-104 may also be configured and arranged to perform process 400.

As shown in FIG. 4, process 400 begins, after a start block, at block 402. It will be readily recognized that while blocks 402, 404, and 406 may be performed in real-time as described in the figure, they may also be performed separate from process 400. For example, in one embodiment, blocks 402, 404, and 406 may also be performed as a preliminary analysis action, performed based on an event, condition, time, or the like. For example, in one embodiment, blocks 402, 404, and 406 may be performed as actions distinct from process 400 weekly, or bi-weekly. In another embodiment, these blocks may also be performed based on some event, such as when feedback or other measures indicate a change in volume characteristics of messages that is deemed to be significant.

In any event, block 402 is described in more detail below in conjunction with FIG. 6. Briefly, however, at block 402, message traffic is received associated with a given IP address (or other source identifier). In one embodiment, a variety of IP addresses may be provide message traffic. Such message traffic may be received over a given period of time, based in part, on overall volumes of messages received, a desired level of confidence desired (e.g. type I or type II statistical errors), or the like. For example, the traffic may be received during a period of a day, a couple of hours, or even over several days. In any event, based on block 402, the IP addresses may be grouped into IP groups based on their message volumes (number of messages during the defined period). In one embodiment, the output may further provide a minimum and maximum volume of messages for each of the defined IP groups. Grouping IP addresses based on message volumes may also provide insight as to whether or not a given IP address is likely to be a spammer. For example, at least some historical data analysis appears to indicate that a large amount of spam is typically sent by IP addresses whose daily sending of messages is less than some number of messages, such as less than around 70K messages, or so. Similarly, analysis of historical data appears to indicate that a large amount of non-spam (ham) is typically sent by IP addresses whose daily sending of messages is larger than around 50K messages, or so.

Processing then moves to block 404, which is described in more detail below in conjunction with FIG. 7. Briefly, however, at block 404, an analysis is performed to determine a distribution of message sizes for each of the IP groups identified at block 402. In one embodiment, the messages are distributed across various buckets within the distribution based on ranges of message sizes. In one embodiment, a number of buckets for partitioning a distribution of messages may be determined based on historical data. For example, in one embodiment, historical data may indicate that 4-6 buckets (e.g., ranges of sizes) may be used to distribute messages approximately evenly for a non-spammer IP address and/or group of non-spamming IP addresses. For example, data analysis may indicate, that approximately 20% of the messages for non-spammer IP addresses may fall within a first bucket, where the bucket range of message sizes is between zero and about 13 Kbytes. A second bucket might that be identified with a range between 13 KB and 21 KB so that it includes about 20% of messages. Similarly, a third bucket might have a range of sizes between 21 KB and 29 KB; a fourth bucket might have a range of sizes between 29 KB and 44 KB, and a fifth bucket might have a range of message sizes that exceed 44 KB. Using this arrangement, about 80% of messages based on message sizes may be distributed over at least the first four buckets. However, as message sizes may change over time based on social changes, technology changes, or the like, the number of buckets, ranges for the buckets, and the like, may also change. Thus, additional analysis using blocks 402 and/or 404 may be performed periodically, or based on some event, or the like, to adjust the ranges, number of buckets, IP groups, or the like.

Processing continues next to block 406, where entropy thresholds are determined for the IP groups. Such thresholds may be used, in one embodiment, to determine whether a given IP address's entropy identifies the given IP address as a spammer, non-spammer, or a spammer suspect. In any event, the entropy of IP addresses or groups of IP addresses, for a given distribution of messages based on sizes may be determined by determining a percentage of messages for each bucket of message sizes over a total number of messages. That is:

$$P(bucket_i) = \text{Count of messages}_i/\text{Total count of messages across all buckets}$$

The entropy of the IP address, or group of IP addresses, may represent how distributed or clustered messages are based on message sizes. Based on historical analysis of various known spammers, and known non-spammers, it has been observed that generally, if an entropy for a given IP address is small, then the sizes of the messages are quite similar. Moreover, such clustered message sizes tend to indicate bulk mailing, which may then indicate a spammer, or at least a suspect spammer. It could also indicate a valid bulk mailer. However, further analysis may be conducted to re-classify the suspect spammer. If the entropy however is determined to be large, then typically the sizes of the messages are fairly distributed across the buckets, indicating that the messages are likely to be different, and therefore, less likely to be spam messages.

One approach for determining entropy based on message sizes might be:

$$\text{Entropy} = -\Sigma P(\text{bucket}_i)\log(P(\text{bucket}_i)), \text{ for all } i \text{ buckets}.$$

It should be noted that other equations may also be used to determine entropy of message sizes, and thus, the invention is not constrained to the above equations.

In any event, at block 406, entropies for the IP groups may be determined. In one embodiment, where the IP groups are known to be of non-spammers, the entropies for the IP groups may be used as a threshold value upon which to test an entropy for given IP addresses.

Processing thus flows to block 408, where messages are received for the given IP address and distributed into the size buckets as described above. Then, an entropy for the given IP address may be determined.

In one embodiment, an amount of messages received over a given time may be used to determine which of the IP groups the given IP address is similar to. For example, if the given IP address is determined to be sending a number of messages below 50K, then the IP address might be associated with that IP group. Such association may be used to determine an entropy threshold for comparisons. For example, where the entropy for the given IP address is below the entropy threshold for the selected IP group, then the given IP address might be classified as a bulk mailer—e.g., a suspected spammer. If the entropy of the given IP address is above the selected entropy threshold, then the IP address might be classified as likely to be a non-spammer. In one embodiment, where the entropy for the given IP address is significantly below the selected entropy threshold, then the given IP address may be classified as being determined to be a spammer, and not just suspected as being a spammer.

In one embodiment, where historical data appears to indicate that IP addresses falling within a given IP group is extremely unlikely to send spam, such information may also be used to determine whether to continue analysis on the given IP address. Thus, in one embodiment, grouping of an amount of messages within a given time period may also be used to classify the given IP address as a non-spammer, spammer, or suspected spammer. Such grouping based on an amount of messages may be performed in addition to analyzing the entropy for the given IP address, or performed instead of analyzing the entropy. For example, in one embodiment, if the among of messages indicates the given IP address is not likely to be a spammer, then the entropy analysis might be avoided.

In any event, processing continues to decision block 410, where based on the analysis performed at block 408, a determination is made whether the given IP address is likely to be a bulk mailer (e.g., suspected spammer or otherwise a suspect IP address). If so, then processing flows to decision block 412; otherwise, processing branches to block 418.

At decision block 412, additional analysis may be performed on the given IP address. For example, a white list that identifies IP addresses (or other source identifiers) of message senders that are known to be non-spammers is used to determine whether the given IP address is within the white list. If the given IP address is not identifiable within the white list of known non-spammer IP addresses, then processing moves to decision block 414; otherwise, processing branches to block 418.

At decision block 414, a determination is made whether to assign the given IP address to a 'dark-grey' list, which indicates that the given IP address is a suspected spammer. Such decision may be based on any of a variety of criteria, including, but not limited to whether the given IP address has been seen before, and was determined then as a suspected spammer, or the like. In any event, if the determination is positive, then processing flows to block 420, where the IP address is placed into the 'dark-grey' list of suspected IP spammers. Upon completion of block 420, processing flows to block 422. However, if the decision is not to move the given IP address into the dark-grey list, then processing moves to decision block 416.

At decision block 416, a determination is made whether the given IP address is identifiable within a dark list of known spammer IP addresses, sub-networks of IP addresses, and the like. If the given IP address is identifiable within the dark list, then the processing flows to block 422, which is described in more detail below in conjunction with FIG. 5. Briefly, however, at block 422, messages from the given IP address are selectively blocked. That is, based on given criteria, some messages may be blocked from being sent to the intended recipients, while others may be allowed to be sent to the intended recipients. At decision block 416, if the given IP address is not identifiable within the dark list, then processing flows to block 418.

At block 418, messages from the given IP address are allowed to be sent to the in boxes associated with the intended recipients for the messages. Processing then returns to a calling process to perform other actions.

Figure 5:
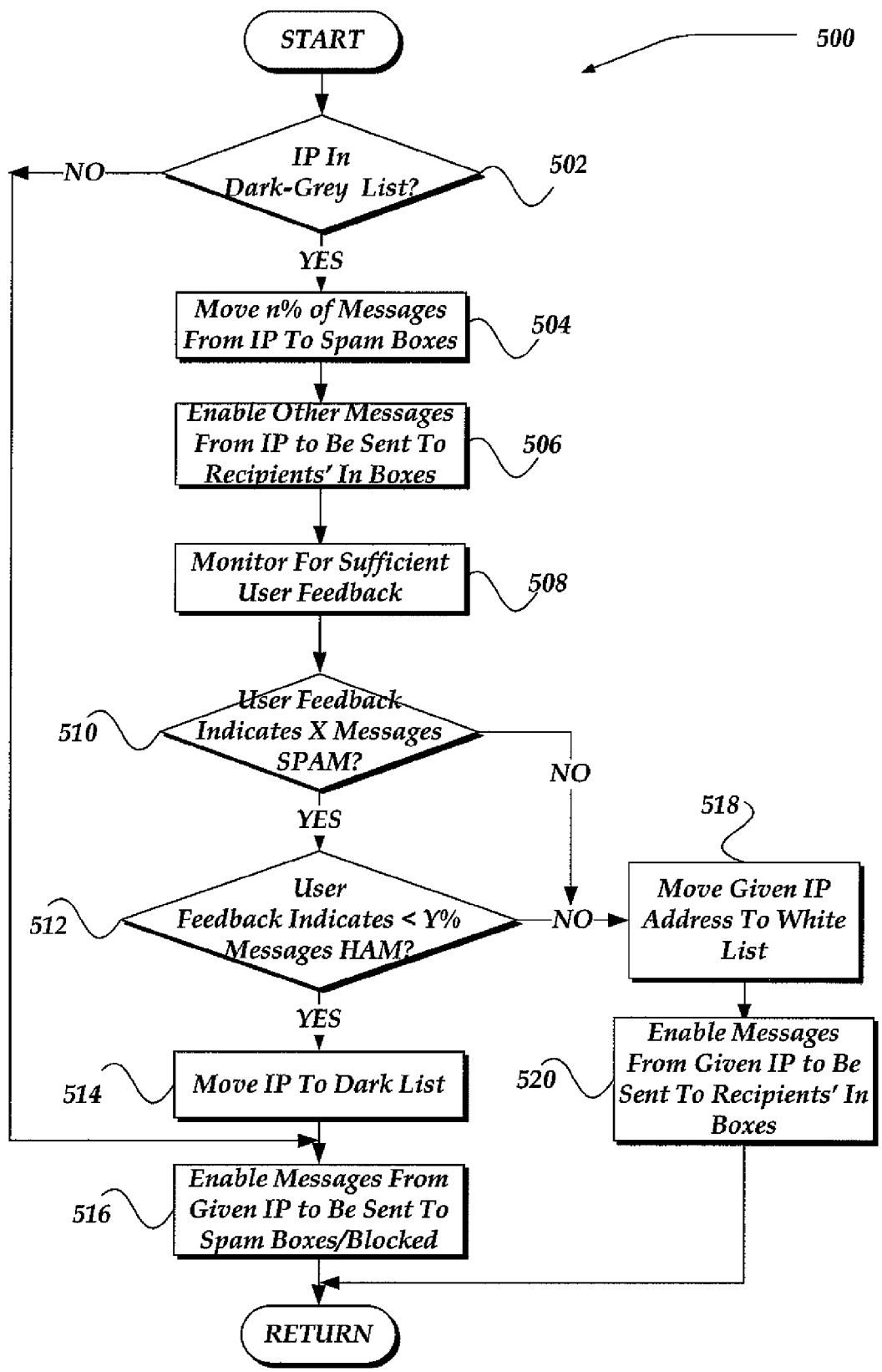
FIG. 5 illustrates a flow diagram generally showing one embodiment of an overview of process of managing suspicious IP addresses.

FIG. 5 illustrates a flow diagram generally showing one embodiment of an overview of process of managing suspicious IP addresses or IP addresses that are suspected to be spammers, but may also be legitimate bulk mailers. Process 500 of FIG. 5 may be employed as one embodiment of a process using at block 422 in FIG. 4. However, other processes may also be employed, without departing from the scope of the invention.

Process 500 begins, after a start block, at decision block 502, where a determination is made whether the given IP address is currently within the dark-grey list of suspected spammer addresses. If not, then processing may flow to block 516. If, however, the given IP address is within the dark-grey list, then processing proceeds to block 504.

At block 504, a percentage of the messages received from the given IP address may be allowed to be sent to their intended recipient's spam boxes, bulk mail boxes, or the like. In this manner, the recipients may be alerted that the messages are suspect. Further, by sending the messages to such boxes, the recipient is likely to perform some action that may move the message, delete the message, or the like. Feedback about such user actions may then be used to indicate how the user interpreted the message (e.g., as spam, or not spam). The number of messages that are allowed to be sent may vary; however, it may be desirable to allow a low percentage to through, so as not to upset the recipients should it be later determined that the messages are virtually all spam. Thus, a typical allowable percentage might be between 5-15%. However, other values may also be used. In any event, processing flows next to block 508, where feedback is monitored. In one embodiment, the monitoring may be performed for some defined time period. For example, in one embodiment, the given IP spammer might remain within the dark-grey list, with the defined percentage of message sent, monitoring for feedback for between 6-20 hours, or so. In one embodiment, the monitoring might be for at about one day, to allow users the opportunity to access their message folders. In one embodiment, the process might include a counter, timer, or the like, within block 508 so that the process is enabled to receive enough user feedback to make a decision. Thus, in one embodiment, process 508 continues to monitor for user feedback until a statistically significant amount has been received. Such amount may be based, for example, upon engineering experience, an amount of messages received from the given IP, or the like.

In any event, when it is determined that enough user feedback has been received, process 500 flows next to decision block 510, a determination is made whether after the defined time period whether the user feedback indicates that some number of the messages is span. If so, then processing flows to decision block 512; otherwise, processing flows to block 518.

At decision block 512, a determination is made whether after the defined time period whether user feedback indicates that some defined percentage of messages received was ham or not spam, and that the percentage of ham (not spam) messages is below some threshold value. The threshold value may be virtually any number; however, typically, the percentage of messages that are determined by the users' feedback as being ham should be above between 45-50%. If the percentage of ham messages is below the threshold value, then the given IP address is determined to be a spammer, and processing flows to block 514, where the given IP address is moved to the dark list. Processing then flows to block 516, where messages for the given IP address may further be blocked from being delivered, rejected, and/or delivered to a recipient's mail box identified as spam/bulk mail, or the like. Process 500 then returns to a calling process to perform other actions.

Alternatively, at decision block 512, processing flows to block 518, where the given IP address may be moved to the white list to indicate that based on the user feedback, the given IP address is likely to be a non-spammer. Processing continues to block 520 where messages from the given IP address by also be enabled for delivery to a recipient's inbox. Processing then returns to a calling process from block 520, to perform other actions.

Figure 6:
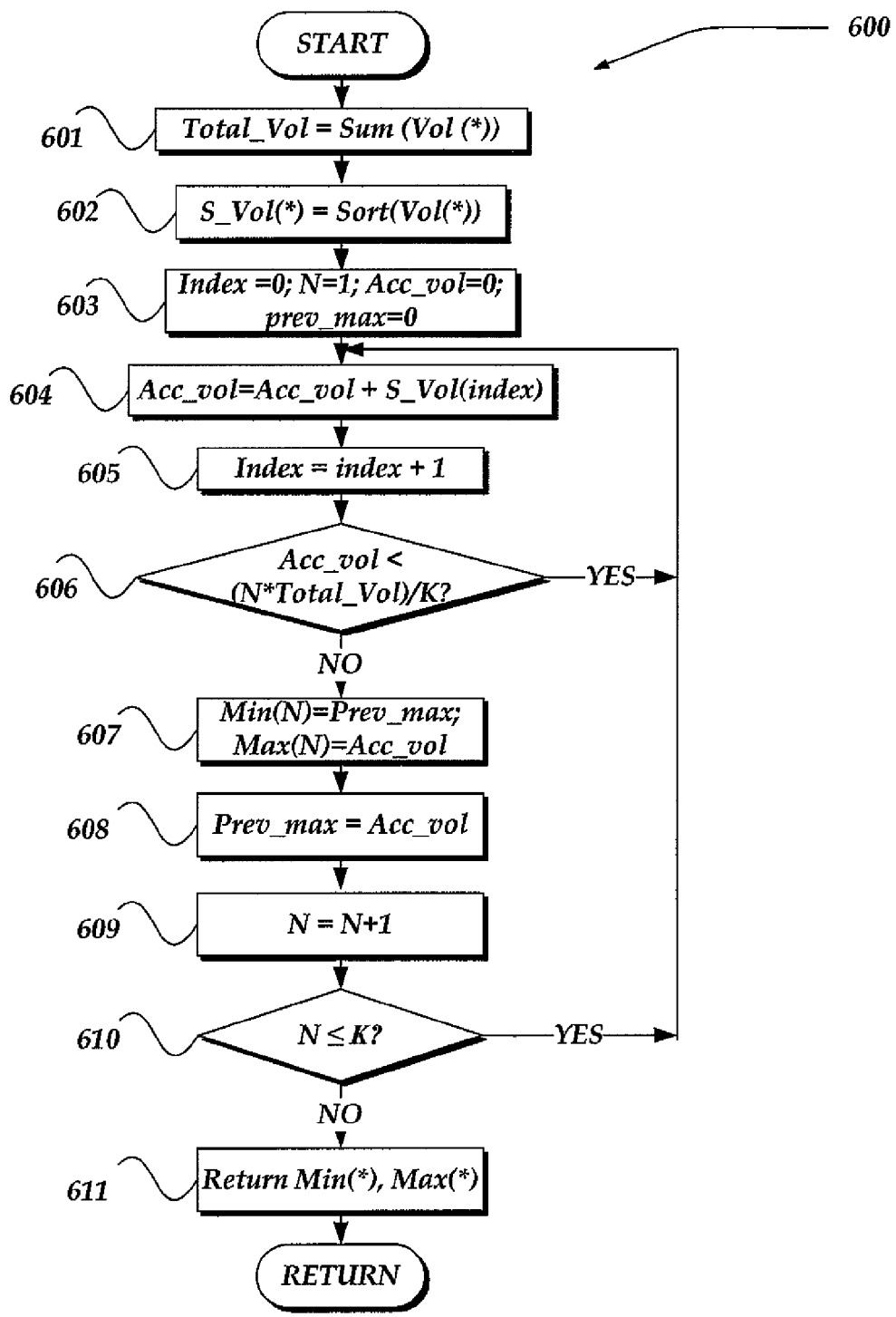
FIG. 6 illustrates a flow diagram generally showing one embodiment of an overview of process of determining groupings of IP addresses based on message volumes.

FIG. 6 illustrates a flow diagram generally showing one embodiment of an overview of process of determining groupings of IP addresses based on message volumes. That is, message traffic is received for various IP addresses, wherein may then be grouped into IP groups based on volumes of messages received from a given IP address. Moreover, output of process 600 of FIG. 6 also provides a minimum volume and a maximum volume (e.g., a range) of volumes for each of the IP groups. Process 600 may represent one embodiment of a process useable for block 402 of FIG. 4 described above.

Process 600 may be begins, after a start block, at block 601, where the volumes for each IP address are summed to generate a total volume of messages received over all IP addresses being considered.

Processing continues next to block 602, where the volumes for each IP address may be sorted into a by volume ordering. Such ordering may, for example, be arranged from a first IP address having a lowest volume of messages to a last IP address having a largest volume of messages being considered.

Continuing next to block 603, various local parameters are initialized, including, an index counter (index), a group counter (N), an accumulated volume (acc_vol), and a previous maximum value (prev_max). The process flows next to block 604, where the accumulated volume is revised by adding a volume of the ith (index) IP address from the sorted IP addresses with a previous value of the accumulated volume. The index is next incremented, at block 605, and at decision block 606, a determination is made whether the accumulated volume is below N*total_vol/K, where K is the number of IP groups for the collected IP addresses. In one embodiment, the number of IP groups may be selected based on a variety of criteria, including engineering judgment, statistical sampling, and analysis of prior IP addresses, or the like. In one embodiment, K may be set to five. However, other values may also be selected. Typical values for K may be between about three to about 10. In any event, if the accumulated volume (acc_vol) is below the computed value, then processing loops back to block 604, to include more volumes from the sorted IP addresses. Otherwise, processing flows to block 607.

At block 607, the minimum and maximum volumes (range of volumes) for the Nth group of IP addresses is determined. Processing proceeds next to block 608, where the previous maximum volume is set based on the current accumulated volume. Process 600 next flows to block 609, where the group counter (N) is incremented. A determination is then made at decision block 610, to determine whether all of the IP groups have been examined. If not, then processing loops back to block 604; otherwise, processing flows to block 611, where the minimum and maximum volume values (ranges) for each of the N IP groups is returned. Processing then returns to a calling process to perform other actions.

Figure 7:
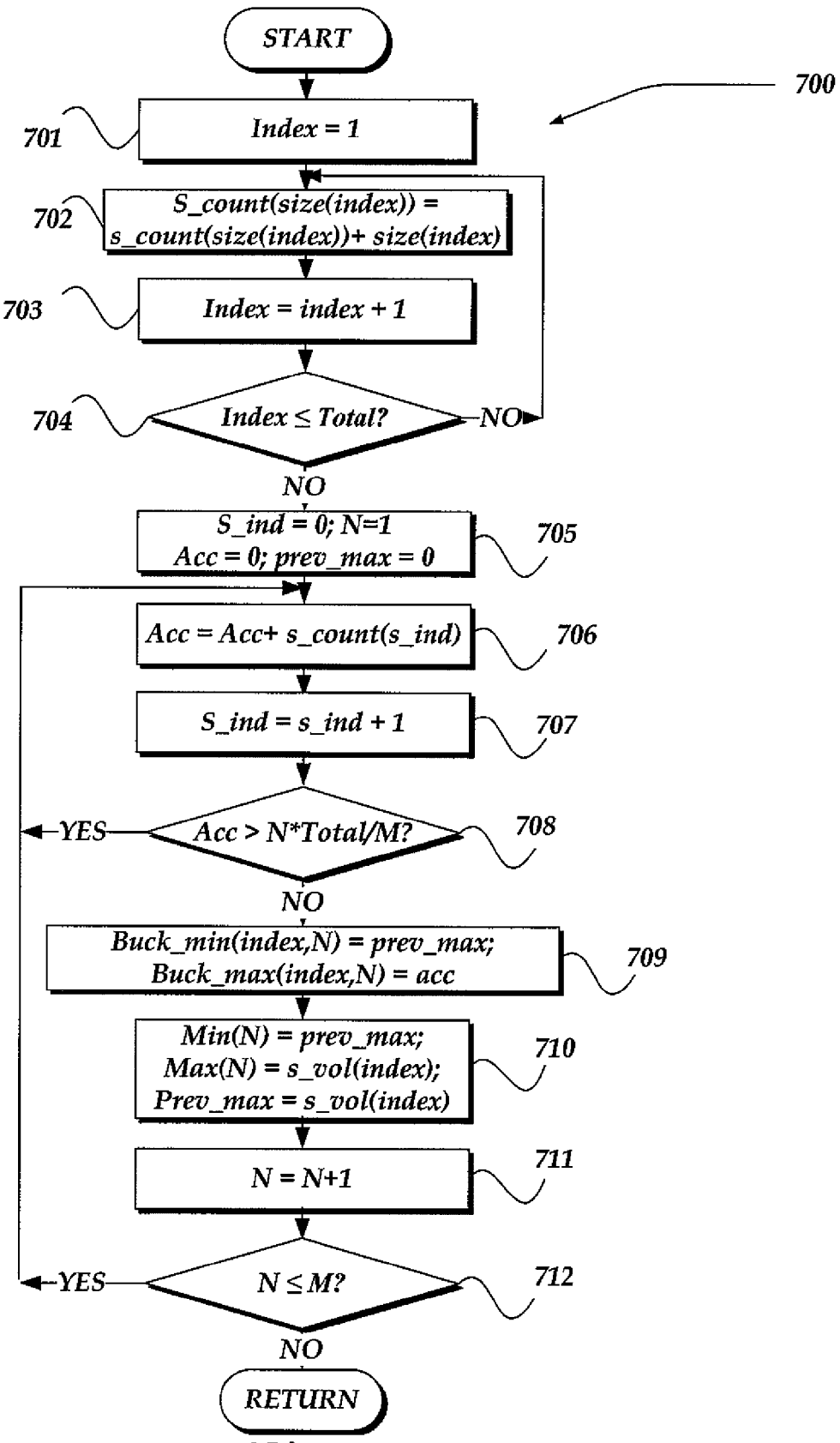
FIG. 7 illustrates a flow diagram generally showing one embodiment of an overview of process of analyzing a distribution of messages sizes for an IP address.

FIG. 7 illustrates a flow diagram generally showing one embodiment of an overview of process of analyzing a distribution of messages sizes for an IP address. Process 700 of FIG. 7 may represent one embodiment of a process useable at block 404 of process 400 described above. It should be noted however, the invention is not limited to using process 700 as described below, and other mechanisms may also be employed to "bucketize" messages for an IP address into various bucket ranges. As is also determined for each bucket are the minimum and maximum volume of emails (ranges) for an IP address.

Process 700 begins, after a start block, at block 701, where an index is initialize that is useable to control the flow of process 700 over a total number of messages for a given IP address (or IP group of addresses).

Processing continues next to blocks 702, where a sum of message sizes is obtained over all the messages received during the defined period of time. At block 703 the index is incremented, and at decision block 704 the index is tested to determine whether all the message sizes have been summed. If not, then processing loops back to 702; otherwise, processing flows to block 705.

At block 705, various indices (s_ind, and N) are initialized, as are various accumulators (ace, and prev_max). Processing continues next to block 706, where an accumulation of the number of message is determined for the given bucket (s_ind). The processing flows next to 707, where the bucket index counter is incremented. Processing continues next to decision block 708, where a determination is made whether the accumulated count of messages is greater than N*total/M, where M is the number of buckets for the IP address, IP group, or the like, being evaluated. If true, processing loops back to block 706; otherwise, processing moves to block 709.

At block 709, the bucket minimum and maximum values for ranges of message sizes are determined for the given bucket. Processing moves next to block 710, where the minimum and maximum values of number of messages for the N bucket are also determined, as applicable. The bucket count is incremented at block 711, and at decision block 712 a determination is made whether all of the buckets have been examined. If not, processing loops back to block 706; otherwise processing returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause operational steps to be performed by the processor to produce a computer implemented process such that the instructions, which execute on the processor to provide steps for implementing the actions specified in the flowchart block or blocks. In one embodiment, at least some of the operational steps may be performed serially; however, the invention is not so limited, and at least some steps may be performed concurrently.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for use in managing delivery of content over a network, comprising:
    determining a plurality of IP address groups from a plurality of messages received from a plurality of different IP addresses, the plurality of messages being grouped based on message volumes received during a given time period for each of the different IP addresses;
    determining an entropy for each IP address group determined to be associated with non-spam messages;
    determining a distribution of messages for a plurality of messages received from a given IP address by distributing the messages from the given IP address across a plurality of message buckets based on a size of each message;
    determining a percentage of messages within each message bucket within the plurality of message buckets by determining a number of messages in a given message bucket divided by a total number of messages for the given IP address;
    determining a message entropy for the given IP address by summing the percentages of messages times a log of the percentages of messages over all message buckets;
    selecting an entropy as a threshold value from an IP address group associated with non-spam messages based on a comparison of a message volume for the given IP address;
    if the message entropy for the given IP address is determined to be statistically significant from the selected entropy threshold value, then classifying the given IP address as a potential spammer; and
    selectively inhibit sending of messages from the given IP address to message recipients.

2. The method of claim 1, further comprising:
    if the given IP address is classified as a potential spammer, then:
        selectively sending a percentage of messages from the given IP address to intended recipients of the messages;
        preventing another percentage of messages from the given IP address to be sent to the intended recipients of the messages;
        monitoring for feedback from the recipients regarding the sent messages; and
        if recipient feedback indicates that the messages are spam, reclassifying the given IP address as a spammer, and preventing delivery of subsequent messages from the given IP address.

3. The method of claim 1, if a message entropy is determined to be statistically significant further comprises:
    if the determined message entropy is below the selected threshold value, then determining that the given IP address is a potential spammer;
    if the determined message entropy is above the selected threshold, then determining that the given IP address is a non-spammer.

4. The method of claim 1, the method further comprising:
    if the given IP address is determined to be within a sub-network of IP addresses determined to be a spammer sub-network, then classifying the given IP address also as a spammer IP address.

5. A network device for managing delivery of messages over a network, comprising:
    a transceiver to send and receive data over the network; and
    a processor that is operative to perform actions, including:
        determining a plurality of IP address groups from a plurality of messages received from a plurality of different IP addresses, the plurality of messages being grouped based on message volumes received during a given time period for each of the different IP addresses;
        determining an entropy for each IP address group determined to be associated with non-spam messages;
        receiving a plurality of messages, each message being from a given IP address of a message sender;
        determining a distribution of messages for the plurality of messages received from the given IP address by distributing the messages from the given IP address across a plurality of message buckets based on a size of each message;
        determining a percentage of messages within each message bucket within the plurality of message buckets by determining a number of messages in a given message bucket divided by a total number of messages for the given IP address;
        determining a message entropy for the given IP address by summing the percentages of messages times a log of the percentages of messages over all message buckets;

selecting an entropy as a threshold from an IP address group associated with non-spam messages based on a comparison of message volumes for the given IP address and the IP address group; and if the message entropy indicates that the given IP address is a bulk mailer based on a comparison of the selected entropy threshold value, selectively inhibit sending of a subsequent message from the given IP address to a message recipient.

6. The network device of claim 5, further comprising:
if the given IP address is determined to be a bulk mailer, then:
  selectively sending a percentage of messages from the given IP address to intended recipients; and
  based on recipient feedback regarding the received messages, classifying the given IP address as a known spammer, or a non-spammer.

7. The network device of claim 5, wherein the processor is operative to perform actions, further comprising:
  monitoring feedback regarding the given IP address;
  classifying the given IP address as a spammer or non-spammer based on the monitored feedback; and
  if the given IP address is classified as a non-spammer based on the monitored feedback, placing the given IP address on a white list, such that a subsequent message from the given IP address is allowed to be delivered to an intended recipient.

8. The network device of claim 5, wherein if the message entropy indicates that the given IP address is a bulk mailer further comprises, employing a message entropy threshold for comparison of the message entropy for the given IP address based on a number of messages the given IP address is detected as sending within a defined time period.

9. The network device of claim 5, wherein if the message entropy indicates that the given IP address is a bulk mailer further comprises:
  if the message entropy for the given IP address is below the entropy threshold determining that the given IP address is a bulk mailer; and
  if the message entropy for the given IP address is above the entropy threshold determining that the given IP address is not a bulk mailer.

10. The network device of claim 5, wherein the processor is operative to perform actions, further comprising:
  if the given IP address is associated with a sub-network that is classified as a spammer sub-network, then classifying the given IP address as a spammer IP address.

11. The network device of claim 5, wherein the processor is operative to perform actins, further comprising:
  if the message entropy is over the entropy threshold, determining that the given IP address is a non-spammer, and enabling messages from the given IP address to be sent to their intended recipients.

12. A system for use in managing delivery of messages over a network, comprising:
  a message server that is configured to receive messages from a plurality of different IP addresses, each message being destined to at least one message recipient; and
  a message spam detector configured and arranged to communicate with the message server and to perform actions, including:
    determining a plurality of IP address groups from a plurality of messages received from the plurality of different IP addresses, the plurality of messages being grouped based on message volumes received during a given time period for each of the different IP addresses;
    determining an entropy for each IP address group determined to be associated with non-spam messages;
    receiving a plurality of messages from a given IP address within the plurality of IP addresses;
    determining a distribution of messages for the plurality of messages from the given IP address by distributing the messages from the given IP address across a plurality of message buckets based on ranges of sizes of messages
    determining a percentage of messages within each message bucket within the plurality of message buckets by determining a number of messages in a given message bucket divided by a total number of messages for the given IP address;
    determining a message entropy for the given IP address as a negative sum of a percentage of messages times a log of the percentage of messages over all of the portions of the distribution;
    selecting an entropy as a threshold from an IP address group associated with non-spam messages based on a comparison of a message volume for the given IP address; and
    if the message entropy indicates the given IP address is a bulk mailer based on a comparison of the message entropy for the given IP address to the selected entropy threshold, selectively inhibit sending of a subsequent message from the given IP address to a message recipient.

13. The system of claim 12, wherein the message spam detector is configured and arranged to perform actions, further comprising:
  if the message entropy is statistically below the selected entropy threshold, then determining that the given IP address is a bulk mailer; and
  if the message entropy is statistically above the selected entropy threshold, then determining that the given IP address is a non-spammer.

14. The system of claim 12, wherein selectively inhibit sending of a subsequent message from the given IP address to a message recipient further comprises:
  selectively sending a percentage of messages from the given IP address to intended recipients; and
  based on recipient feedback regarding the received messages, classifying the given IP address as a known spammer, or a non-spammer.

15. A mobile device for managing received messages, comprising:
  a transceiver to send and receive data over the network; and
  a processor that is operative to perform actions, including:
    determining a plurality of IP address groups from a plurality of messages received from the plurality of different IP addresses, the plurality of messages being grouped based on message volumes received during a given time period for each of the different IP addresses;
    determining an entropy for each IP address group determined to be associated with non-spam messages;
    receiving a plurality of messages, each message being from a given IP address of a message sender;
    determining a distribution of messages for the plurality of messages received from the given IP address by distributing the messages from the given IP address across a plurality of message buckets based on a size of each message
    determining a percentage of messages within each message bucket within the plurality of message buckets by determining a number of messages in a given message bucket divided by a total number of messages for the given IP address;

determining a message entropy for the given IP address by summing the percentages of messages times a log of the percentages of messages over all message buckets;

selecting an entropy as a threshold from an IP address group associated with non-spam messages based on a comparison of a message volume for the given IP address;

if the message entropy indicates that the given IP address is a bulk mailer based on a comparison of the message entropy for the given IP address to the selected entropy threshold, selectively inhibiting messages from the given IP address to be moved to a message inbox; and if the message entropy indicates that the given IP address is a non-bulk mailer, moving the messages to a message inbox.

16. The mobile device of claim 15, wherein if the message entropy indicates that the given IP address is a bulk mailer, further selectively moving a percentage of messages from the given IP address into a message spam or bulk message box; and further classifying the given IP address as a spammer or as a non-spammer based on user input regarding the messages moved to the spam or bulk message box.

17. The mobile device of claim 15, wherein determining if the message entropy indicates that the given IP address is a bulk mailer or a non-bulk mailer, further comprises:

if the message entropy is statistically below the threshold value, then indicating that the given IP address is a bulk mailer; and if the message entropy is statistically above the threshold value, then indicating that the given IP address is a non-bulk mailer.

* * * * *

UNITED STATES PATENT AND TRADEMARK OFFICE
CERTIFICATE OF CORRECTION

PATENT NO. : 7,849,146 B2  Page 1 of 1
APPLICATION NO. : 12/035371
DATED : December 7, 2010
INVENTOR(S) : Jaesik Choi et al.

It is certified that error appears in the above-identified patent and that said Letters Patent is hereby corrected as shown below:

In column 3, line 34, delete "108-109" and insert -- 108-109. --, therefor.

In column 7, line 32, delete "(UiwB)" and insert -- (UWB) --, therefor,

In column 7, line 43, delete "action" and insert -- action. --, therefor.

In column 8, line 21, delete "OPS" and insert -- GPS --, therefor.

In column 10, line 47, delete "Her" and insert -- further --, therefor.

In column 11, line 32, delete "list" and insert -- list, --, therefor.

In column 15, line 24, delete "span." and insert -- spam. --, therefor.

Signed and Sealed this
Twenty-sixth Day of April, 2011

David J. Kappos
*Director of the United States Patent and Trademark Office*